US012789649B2

(12) United States Patent
Messina et al.

(10) Patent No.: US 12,789,649 B2
(45) Date of Patent: Nov. 10, 2026

(54) CHARGING ELECTRIFIED PRODUCTS WHILE MOVING BETWEEN JOB SITES

(71) Applicant: Oshkosh Corporation, Oshkosh, WI (US)

(72) Inventors: Robert Messina, Oshkosh, WI (US); Shashank Bhatia, Oshkosh, WI (US); Ignacy Puszkiewicz, Oshkosh, WI (US); Mike Buhidar, Oshkosh, WI (US); David Lombardo, Oshkosh, WI (US); Peter Gilbert, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 210 days.

(21) Appl. No.: 18/123,407

(22) Filed: Mar. 20, 2023

(65) Prior Publication Data

US 2023/0294528 A1 Sep. 21, 2023

Related U.S. Application Data

(60) Provisional application No. 63/321,981, filed on Mar. 21, 2022.

(51) Int. Cl.
*B60L 53/122* (2019.01)
*B60L 53/66* (2019.01)
(Continued)

(52) U.S. Cl.
CPC ........... *B60L 53/122* (2019.02); *B60L 53/665* (2019.02); *B60P 1/44* (2013.01); *B60P 3/06* (2013.01);
(Continued)

(58) Field of Classification Search
None
See application file for complete search history.

(56) References Cited

U.S. PATENT DOCUMENTS 11,532,943 B1 * 12/2022 Zauli .......................... H02J 3/32
2013/0002198 A1 * 1/2013 McCluskey ............. H02J 7/342
320/109
(Continued)

FOREIGN PATENT DOCUMENTS

DE 102016003532 A1 * 11/2016
DE 102018207768 A1 * 11/2019

*Primary Examiner* — Davin Seol
(74) *Attorney, Agent, or Firm* — Foley & Lardner LLP

(57) ABSTRACT

A vehicle can include a plurality of tractive elements, a bed, an electrical power source including a battery assembly, one or more wireless charging devices electrically coupled with the electrical power source, and a controller communicably coupled with the electrical power source. The one or more wireless charging devices can be configured to wirelessly provide power to one or more rechargeable batteries of one or more lift devices positioned on the bed via an inductive coil. The controller can be configured to determine battery information regarding a state of charge of the battery assembly and a state of charge of the one or more rechargeable batteries of the one or more lift devices. The controller can be configured to initiate, based on the determined battery information, a charging operation to charge the one or more rechargeable batteries of the one or more lift devices via the inductive coil of the one or more wireless charging devices.

19 Claims, 5 Drawing Sheets

(51) Int. Cl.

| | |
|---|---|
| ***B60P 1/44*** | (2006.01) |
| ***B60P 3/06*** | (2006.01) |
| ***H02J 7/40*** | (2026.01) |
| ***H02J 7/50*** | (2026.01) |
| ***H02J 7/82*** | (2026.01) |
| ***H02J 7/90*** | (2026.01) |
| ***H02J 50/10*** | (2016.01) |
| ***H02J 50/40*** | (2016.01) |

(52) U.S. Cl.

CPC .................. *H02J 7/40* (2026.01); *H02J 7/50* (2026.01); *H02J 7/82* (2026.01); *H02J 7/977* (2026.01); *H02J 50/10* (2016.02); *H02J 50/402* (2020.01)

(56) References Cited

U.S. PATENT DOCUMENTS

2015/0033962 A1 2/2015 Schwartz et al.
2015/0159564 A1 6/2015 Wildgrube et al.
2015/0175353 A1 6/2015 Gillmore et al.
2016/0006282 A1* 1/2016 Winkler .............. H02J 7/00047 320/150
2017/0253221 A1 9/2017 Verhoff et al.
2017/0291802 A1 10/2017 Hao et al.
2017/0291805 A1 10/2017 Hao et al.
2017/0297425 A1 10/2017 Wildgrube et al.
2018/0162704 A1 6/2018 Hao et al.
2018/0312080 A1* 11/2018 Beaver ................ B60L 15/2045
2019/0066516 A1* 2/2019 Kuhara .................. G06Q 50/40
2019/0071291 A1 3/2019 Puszkiewicz et al.
2019/0119088 A1 4/2019 Puszkiewicz et al.
2019/0121353 A1 4/2019 Datema et al.
2019/0185077 A1 6/2019 Smith et al.
2019/0185301 A1 6/2019 Hao et al.
2019/0322321 A1 10/2019 Schwartz et al.
2019/0322512 A1 10/2019 Puszkiewicz et al.
2019/0351883 A1 11/2019 Verhoff et al.
2019/0352157 A1 11/2019 Hao et al.
2020/0031641 A1 1/2020 Puszkiewicz et al.
2020/0094671 A1 3/2020 Wildgrube et al.
2020/0140248 A1 5/2020 Hackenberg et al.
2020/0262305 A1* 8/2020 Chakraborty ........... B60L 53/57
2020/0316816 A1 10/2020 Messina et al.
2020/0317065 A1 10/2020 Lombardo
2020/0317083 A1 10/2020 Messina et al.
2020/0317480 A1 10/2020 Shankar et al.
2020/0317486 A1 10/2020 Puszkiewicz et al.
2020/0317488 A1 10/2020 Bafile et al.
2020/0317489 A1 10/2020 Bhatia et al.
2020/0317491 A1 10/2020 Bafile et al.
2020/0317492 A1 10/2020 Bhatia et al.
2020/0317493 A1 10/2020 Lombardo et al.
2020/0346547 A1 11/2020 Rocholl et al.
2021/0002112 A1 1/2021 Puszkiewicz et al.
2021/0031611 A1 2/2021 Yakes et al.
2021/0031612 A1 2/2021 Yakes et al.
2021/0031649 A1 2/2021 Messina et al.
2021/0039935 A1 2/2021 Hackenberg et al.
2021/0124347 A1 4/2021 Datema et al.
2021/0155463 A1 5/2021 Hao et al.
2021/0221216 A1 7/2021 Yakes et al.
2021/0229755 A1 7/2021 Schwartz et al.
2021/0252969 A1 8/2021 Wildgrube et al.
2021/0276423 A1 9/2021 Lombardo et al.
2021/0276848 A1 9/2021 Miller et al.
2021/0276850 A1 9/2021 Lombardo et al.
2021/0279991 A1 9/2021 Shankar et al.
2021/0316625 A1* 10/2021 Oetken ................... B60L 53/30
2021/0323763 A1 10/2021 Koga et al.
2021/0323764 A1 10/2021 Koga et al.
2021/0323765 A1 10/2021 Koga et al.
2021/0325529 A1 10/2021 Koga et al.
2021/0325911 A1 10/2021 Koga et al.
2021/0327164 A1 10/2021 Koga et al.
2021/0345062 A1 11/2021 Koga et al.
2021/0362696 A1 11/2021 Verhoff et al.
2021/0362697 A1 11/2021 Verhoff et al.
2021/0370893 A1 12/2021 Verhoff et al.
2021/0370894 A1 12/2021 Verhoff et al.
2021/0373560 A1 12/2021 Koga et al.
2021/0380085 A1 12/2021 Verhoff et al.
2021/0380179 A1 12/2021 Smith et al.
2021/0395058 A1 12/2021 Hao et al.
2021/0408820 A1* 12/2021 Koenen ................... B60P 1/435
2022/0009338 A1 1/2022 Yakes et al.
2022/0033181 A1 2/2022 Koga et al.
2022/0097527 A1 3/2022 Koga et al.
2022/0097961 A1 3/2022 Koga et al.
2022/0097964 A1 3/2022 Koga et al.
2022/0135385 A1 5/2022 Lombardo et al.
2022/0144226 A1 5/2022 Verhoff et al.
2022/0144227 A1 5/2022 Verhoff et al.
2022/0176921 A1 6/2022 Verhoff et al.
2022/0185582 A1 6/2022 Koga et al.
2022/0185643 A1 6/2022 Messina et al.
2022/0194333 A1 6/2022 Verhoff et al.
2022/0194334 A1 6/2022 Verhoff et al.
2022/0234554 A1 7/2022 Verhoff et al.
2022/0234555 A1 7/2022 Verhoff et al.
2022/0234873 A1 7/2022 Miller et al.
2022/0255371 A1* 8/2022 Powell ...................... H02J 7/02
2022/0289152 A1 9/2022 Verhoff et al.
2022/0332556 A1 10/2022 Kobel et al.
2022/0348090 A1 11/2022 Lombardo
2022/0371864 A1 11/2022 Shankar et al.
2023/0002152 A1 1/2023 Koga et al.
2023/0049763 A1 2/2023 Messina et al.
2023/0089417 A1 3/2023 Koga et al.
2023/0092520 A1 3/2023 Verhoff et al.
2023/0130029 A1 4/2023 Schwartz et al.
2023/0142225 A1 5/2023 Kobel et al.
2023/0183050 A1 6/2023 Puszkiewicz et al.
2023/0184934 A1 6/2023 Koga et al.

* cited by examiner

CHARGING ELECTRIFIED PRODUCTS WHILE MOVING BETWEEN JOB SITES

CROSS REFERENCE TO RELATED PATENT APPLICATION

This application claims the benefit of and priority to U.S. Provisional Patent Application No. 63/321,981, filed Mar. 21, 2022, which is incorporated herein by reference in its entirety.

BACKGROUND

Aerial work platforms (AWPs) and mobile elevating work platforms (MEWPs) are increasingly transitioning to semi-electric or all electric configurations. To support the increasing electrification of these AWPs and MEWPs, the vehicles are equipped with one or more charge storing devices, such as batteries. Because the capacity of charge storing devices is limited, recharging is frequently needed.

SUMMARY

One embodiment relates to a vehicle. The vehicle can be a delivery vehicle. The delivery vehicle can include a plurality of tractive elements, a bed, an electrical power source including a battery assembly, one or more wireless charging devices electrically coupled with the electrical power source, and a controller communicably coupled with the electrical power source. The one or more wireless charging devices can be configured to wirelessly provide power to one or more rechargeable batteries of one or more lift devices positioned on the bed via an inductive coil. The controller can be configured to determine battery information regarding a state of charge of the battery assembly and a state of charge of the one or more rechargeable batteries of the one or more lift devices. The controller can be configured to initiate, based on the determined battery information, a charging operation to charge the one or more rechargeable batteries of the one or more lift devices via the inductive coil of the one or more wireless charging devices.

Another embodiment relates to a method of charging an electrified lift device during transportation. The method can include determining, by a controller of a delivery vehicle, battery information regarding one or more rechargeable batteries of one or more lift devices positioned on a bed of the delivery vehicle. The delivery vehicle can include a plurality of tractive elements and can be configured to transport the one or more lift devices to a destination. The method can further include initiating, based on the determined battery information, a charging operation to charge the one or more rechargeable batteries of the one or more lift devices while the delivery vehicle is transporting the one or more lift devices to the destination. The delivery vehicle further can include an electrical power source, the electrical power source configured to provide electrical power to charge the one or more rechargeable batteries of the one or more lift devices during the charging operation.

Another embodiment relates to a controller for a delivery vehicle. The controller can include a communication interface and a processing circuit communicably coupled with the communication interface. The processing circuit can include one or more processors and a memory storing instructions. The instructions can, when executed by the one or more processors cause the one or more processors to perform operations. The processor can determine, by a charging operation circuit, battery information regarding a state of charge of a battery assembly of the delivery vehicle and a state of charge of one or more rechargeable batteries of one or more lift devices positioned on a bed of the delivery vehicle. The processor can initiate, by the charging operation circuit and based on the determined battery information, a charging operation to wirelessly charge the one or more rechargeable batteries of the one or more lift devices via an inductive coil of one or more wireless charging devices.

The invention is capable of other embodiments and of being carried out in various ways. Alternative exemplary embodiments relate to other features and combinations of features as may be recited herein.

DETAILED DESCRIPTION

Figure 1:
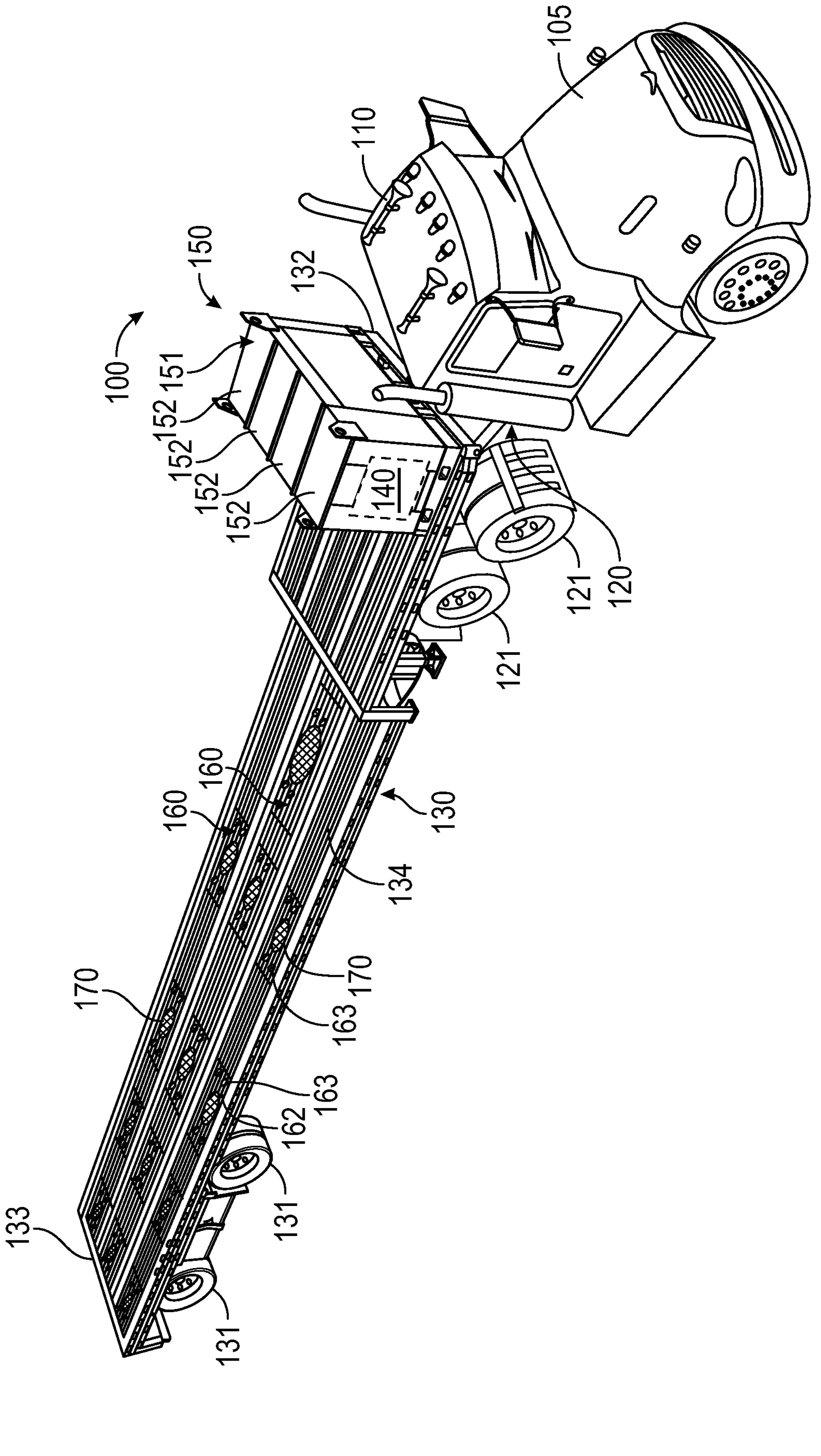
FIG. 1 is a perspective view of a delivery vehicle, according to one embodiment.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring to the figures generally, the various exemplary embodiments disclosed herein relate to systems, apparatuses, and methods for charging one or more electrified lift devices using a delivery vehicle. The lift devices could include Aerial Work Platforms (AWPs), Mobile Elevating Work Platforms (MEWPs), or the like. In various embodiments, the one or more lift devices are at least partially electrified such that they perform certain operation using electrically-powered systems, namely systems that use power supplied by at least one rechargeable battery of the lift device. The system for charging lift devices generally includes a delivery vehicle, such as a flatbed truck that is used to transport a lift device to a job site from a rental depot or vice versa. The delivery vehicle includes a chassis, a first series of tractive elements coupled to the chassis, a motor coupled to the chassis, a bed coupled to the chassis, a second series of tractive elements coupled to the bed, an electrical cabinet coupled to the bed. The bed may be used to transport large objects, such as lift devices. The delivery vehicle may further include a power source—such as a battery assembly comprising a plurality of batteries—that is coupled to the bed. The electrical power source may be coupled to one or more charging pads and may be configured to provide current to the one or more charging pads. The one or more charging pads may be coupled to the bed and may be configured to charge one or more lift devices positioned on the bed.

The one or more charging pads may include one or more induction coils (e.g., copper coils, etc.) that are configured to receive current from the electrical power source of the delivery vehicle or from some other electric power source, such as a utility source (e.g., electrical power delivered from a wall socket, etc.), generator, or battery assembly. When an induction coil is powered, current is supplied from the electrical power source to the induction coil, which creates an electromagnetic field. The electromagnetic field extends upwardly and outwardly from the charging pad, such that a lift device or other equipment positioned above the charging pad can interact with the generated electromagnetic field. The rechargeable battery of the lift device may be communicably coupled to an antenna loop (e.g., a copper coil) that generates a current when the antenna loop is positioned within the electromagnetic field generated by the induction coil. The current within the antenna loop can then be supplied to the rechargeable battery of the lift device, thereby causing the rechargeable battery to charge. In this way, the rechargeable battery of the lift device may be charged wirelessly (e.g., without the need for a wired connection).

Because the electrical power source may be coupled to the bed of the delivery vehicle, the electrical power source may operate while the delivery vehicle is in motion (e.g., transporting a lift device from an origin to a destination). For example, it may be desirable for the rechargeable battery of any lift devices transported by the delivery vehicle from a rental depot to a job site to have a sufficient state of charge upon delivery (rather than requiring further charging to operate effectively upon delivery). Accordingly, the delivery vehicle may include a control system configured to monitor the state of charge for each lift device positioned on the bed of the delivery vehicle and the state of charge of the electrical power source. If the state of charge for a lift device indicates that a charge is required, the control system may prompt the electrical power source to send current to an appropriate induction coil to charge the relevant lift device until a desire state of charge is reached. Similarly, the control system may be configured to monitor other parameters, such as ambient temperature, a distance to the destination, a time before the scheduled delivery, etc. in order to plan or optimize the charging of one or more lift devices during transport. Once the lift device or other equipment achieves a sufficient charge level while positioned on the bed, the electrical power source of the delivery vehicle may stop charging the lift device (e.g., stop sending current to the induction coil).

Referring now to FIG. 1, a delivery vehicle 100 is depicted. The delivery vehicle 100 can be a delivery truck, such as a flat-bed truck, a lowboy truck, an auto-car carrier, a tow truck, or some other delivery vehicle. The delivery vehicle 100 generally includes a primary mover 105, a cab 110, a chassis 120, a first series of tractive elements 121 rotatably coupled to the chassis 120, and a bed 130 coupled to the chassis 120. The delivery vehicle 100 may further include a charging control system 140 configured to control various operations related to charging various electrical devices. According to an exemplary embodiment, the delivery vehicle 100 may be configured to transport one or more lift devices, such as an AWP or MEWP, from a rental depot to a job site (e.g., a construction site) and vice versa. For example, the delivery vehicle 100 may be used to deliver an AWP and a plurality of MEWPs to a construction site and retrieve the AWP and MEWPs after the lift devices are no longer needed and return them to the rental depot.

The bed 130 of the delivery vehicle 100 may include a second set of tractive elements 131 that are rotatably coupled to the bed 130. According to an exemplary embodiment, the bed includes a first end 132 and a second end 133, the first end 132 positioned proximate to the cab 110 of the delivery vehicle 100 when the bed 130 is coupled to the delivery vehicle 100. The second set of tractive elements 131 is coupled to the bed 130 proximate the second end 133, according to an exemplary embodiment. In various embodiments, the bed 130 may be fixed to the chassis 120 of the delivery vehicle 100 such that the bed 130 does not pivot with respect to the delivery vehicle 100. In other embodiments, the bed 130 may be rotatably coupled to the delivery vehicle 100 such that the bed 130 may pivot relative to the delivery vehicle 100, as may be the case if the bed 130 is coupled to a hitch or other coupling mechanism of the chassis 120.

The charging control system 140 of the delivery vehicle 100 maybe communicably coupled to various systems of the delivery vehicle 100, including an electrical power source 150, as discussed in detail below. According to an exemplary embodiment, the charging control system 140 may include a controller and a communication interface. The communication interface may be configured to transmit and receive various wireless communications with the aforementioned systems and components of the delivery vehicle 100 so that those systems and components may be monitored or controlled by the charging control system 140.

The delivery vehicle may further include an electrical power source 150. The electrical power source 150 maybe detachably coupled to the bed 130 or may be integrated into the bed 130. More specifically, the electrical power source 150 may include a battery assembly 151, the battery assembly 151 comprising a plurality batteries configured to store and supply electrical power. The electrical power source 150 may include a plurality of modular battery units 152, each modular battery unit 152 comprising one or more batteries. In such embodiments, the modular battery units 152 can be easily removed from the bed 130 of the delivery vehicle 100 so that they may be charged or serviced, for example. In another embodiment, the electrical power source 150 may be integrated into the bed 130 of the truck by, for example, being installed beneath a surface of the bed 130 so that the entire surface of the bed 130 remains available for lift devices or other cargo to be transported. More specifically, the electrical power source 150 may include one or more battery assemblies 151 or modular battery units 152 installed one or more positions to an underside of the bed 130 (e.g., in a space between structural support beams of the bed 130, etc.). In such embodiments, the electrical power source 150 may be replenished (e.g., recharged) by electrically coupling the battery assembly 151 to some other power source (e.g., a wall socket, a generator, etc.) rather than removing or replacing the battery units.

In addition to battery assembly 151, the electrical power source 150 may also include a variety of different electrical components, such as transformers, inverters, etc. For example, the electrical power source 150 may include one or more transformers that are configured to step down and/or step up voltage received from a secondary source, such as an external power source used to charge the batteries of the electrical power source 150. In some examples, the electrical power source 150 also includes one or more inverters that are configured to transition direct current electricity stored within one or more batteries included in the batteries or modular battery units 152 assembly 112 into alternating current electricity for use by other components, such as a charging device 160 used to wirelessly charge a lift device, as discussed below. The electrical power source 150 may also be communicably coupled to the charging control system 140 so that the electrical power source 150 may be monitored and controlled. For example, the charging control system 140 may be configured to monitor a state of charge of the battery assembly 151 or manage the discharge of electrical power from the battery assembly 151 to the charging device 160, according to an exemplary embodiment.

As indicated above, the battery assembly 151 of the electrical power source 150 may store and discharge electrical energy. According to one embodiment, the battery assembly 151 may periodically be coupled to an external electrical power source, such as a utility source. The utility source can supply standard utility alternating current electrical power at 120 V and 60 Hz, for example. In other embodiments, the electrical power source 150 is placed in communication with a 240 V power source, a 480 V power source, or some other power source. In some embodiments, the battery assembly 151 communicably coupled to one or more batteries powering a motor included in the delivery vehicle 100. In such embodiments, the battery assembly 151 may receive power from other batteries on the delivery vehicle 100 that may be recharged as the delivery vehicle 100 operates (e.g., via an alternator or similar device). In another embodiment, rather than existing as a separate component, the electrical power source 150 may be or may be integrated with the batteries of the delivery vehicle 100 that are charged as the primary mover 105 (e.g., an internal combustion engine, etc.) of the delivery vehicle 100 is operated. In yet another embodiment, the battery assembly 151 of the electrical power source 150 may be configured to receive electrical current from and thus be charged by another system of the delivery vehicle 100, such as a regenerative braking system or other kinetic energy recovery system that captures kinetic energy and stores it as electrical energy in the battery assembly 151.

In various embodiments, the battery assembly 151 comprises a plurality of rechargeable batteries. These batteries may be lithium-ion batteries, lithium-air batteries, lithium-sulfur batteries, nickel-cadmium batteries, lead-acid batteries, or some other type of battery, according to an exemplary embodiment. As noted above, these batteries may be recharged using a variety of methods, including via electricity from a utility source through the inverter that converts the AC utility source power into DC power, where that electrical power is stored within the battery. In other embodiments, the battery assembly 151 may also be charged via some other system of the delivery vehicle 100, such as an alternator coupled to the primary mover 105, a regenerative braking system, a gasoline-powered generator, a solar panel or wind-turbine, etc. In yet another embodiment, the battery assembly 151 may receive electrical current from a lift device being transported on the bed 130 of the truck, whether via wireless means involving the charging device 160 discussed below or by some wired means (e.g., an electrical cable coupling the lift device to the electrical power source 150). In other embodiments, the electrical power source 150 may include an internal combustion engine and a generator that are configured to produce and supply power to charge the battery assembly 151. Furthermore, in some embodiments, the delivery vehicle 100 may include additional batteries that may be used to recharge the battery assembly 151. As will be appreciated, several of these charging methods may be used to charge the battery assembly 151.

In various embodiments, the electrical power source 150 may include a thermal element 153 that is configured to insulate and/or provide heating or cooling energy to the battery assembly 151. The thermal element 153 can be coupled with the battery assembly 151 as a separate element. The thermal element 153 can be integrated with the battery assembly 151 so as to constitute a part of the battery assembly 151. For example, the thermal element 153 can be within a housing of the battery assembly 151. In some examples, the thermal element 153 can be configured to provide heating or cooling energy to the battery assembly 151. Because battery performance (e.g., capacity, charge/discharge rate, or some other performance parameter) can be adversely affected if an operating environment of a battery is too hot or too cold, it may be desirable to (a) insulate the battery assembly 151 to maintain an optimal battery temperature, (b) regulate the temperature of the battery assembly 151 by heating or cooling the battery assembly 151 to achieve an optimal battery temperature, or (c) otherwise affect the temperature of the battery assembly 151 or its surroundings. Managing the temperature of the battery assembly 151 thus conditions the battery assembly 151 so that an acceptable state of charge is maintained and so that other electrical components (e.g., a lift device) may be charged by the battery assembly 151 at a desirable rate. According to an exemplary embodiment, the thermal element 153 may be an insulated battery enclosure configured to protect the battery assembly 151 from weather elements and extreme temperatures. In another embodiment, the thermal element 153 may include a heating element to warm the battery assembly 151 in the event temperatures fall to an undesirable level. An electrical heating element may generate heat using current drawn from the battery assembly 151, according to an exemplary embodiment. In yet another embodiment, the thermal element 153 may be a cooling element, such as a fan, air-conditioning system, water cooling system, etc. that is configured to deliver cooling energy to the battery assembly 151. The various cooling mechanism may be powered, at least in part, by electrical energy supplied by the battery assembly 151, according to an exemplary embodiment. The thermal element 153 can be or include at least one conduit or lumen configured to facilitate the flow of a coolant or other fluid. For example, the coolant can be heated or cooled and can emanate or radiate thermal energy (e.g., heating energy or cooling energy) to the battery assembly 151 as the coolant is circulated. The coolant can be heated or cooled by some other heating device1 (e.g., a resistive heating device) or cooling device (e.g., compressor). As will be appreciated, the thermal element 153 may also include an insulated enclosure, a heating element, and a cooling element in combination.

In some embodiments, the delivery vehicle 100 is configured to facilitate charging between a lift device 200 and a power source external to the delivery vehicle 100 entirely. For example, the delivery vehicle 100 may further include a direct charging interface that bypasses the electrical power source 150 and couples the lift device 200 to an external power source that provides electrical energy to charge the batteries of the lift device 200.

The bed 130 may also include one or more charging devices 160. The charging devices 160 may include at least one induction coil 170. According to an exemplary embodiment, the one or more charging devices 160 are electrically coupled to the electrical power source 150 such that the one or more charging devices 160 may receive electrical current from the electrical power source 150. More specifically, electrical current is provided by the battery assembly 151 of the electrical power source 150 to the one or more charging devices 160, according to an exemplary embodiment. In other embodiments, namely those where the electrical power source 150 does not include a battery assembly 151, current is provided to the one or more charging devices 160 by some other source of electrical power other than the battery assembly 151, such as a generator, the primary mover 105 of the delivery vehicle 100, etc.). In some examples, current is provided to the charging devices 160 by the electrical power source 150 via a wired connection (e.g., an electrical cable). The electrical power transmitted from the electrical power source 150 can be preconditioned (e.g., manipulated or altered via a transformer, inverter, etc.) depending on the electrical supply source or to suit the needs of the charging devices 160. For example, electrical power provided from the battery assembly 151 to the charging devices 160 can be passed through an inverter before being supplied to the charging devices 160, such that alternating current is always provided to the charging devices 160.

As noted above, each of the one or more charging devices 160 may include an induction coil 170. The induction coil 170 may be electrically coupled to a charging device 160 such that electrical current received by the charging device 160 is routed to the induction coil 170. The induction coil 170 may be physically coupled to or formed within the charging device 160, according to an exemplary embodiment. The induction coil 170 itself can be formed of copper wire, for example, and includes one or more turns. When current is provided to the induction coil 170, the current travels around the aforementioned copper wire structure in a circular manner. Movement of the current through the induction coil 170 creates an electromagnetic field that extends vertically upward, through an upper surface 161 of the charging device 160 and above the charging device 160, generally. The electromagnetic field generated by the induction coil 170 can then be used to wirelessly charge a battery of a device placed over the charging device 160 and within the electromagnetic field. According to an exemplary embodiment, the charging device 160, induction coil 170, and the electromagnetic field created by the induction coil 170 may be used specifically to charge a rechargeable battery of a lift device (e.g., an AWP or MEWP) that is positioned on the bed 130 of the delivery vehicle 100 and over one of the one or more charging devices 160, as explained in additional detail below.

In some embodiments, the induction coil 170 is positioned within a charging area 162 formed within the charging device 160. As depicted in FIG. 1, the charging area 162 can be visually marked on the upper surface 161 of the charging device 160 (e.g., with different coloration, pattern, etc.) so that an operator of a lift device or other vehicle can easily identify the location of the induction coil 170 on the charging device 160. In some examples, the charging area 162 is centrally located within the charging device 160.

In various embodiments, the charging device 160 may be formed within the surface 134 of the bed 130. For example, the charging device 160 can be integrated within the bed 130 of the delivery vehicle 100. In such embodiments, the location of the charging device 160 on the bed 130 may be fixed. A lift device can be positioned over the fixed location of the charging device 160 in order to charge the lift vehicle. In other embodiments, the charging device 160 may be detachably placed on the surface 134 of the bed 130. In these embodiments, the location of the charging device 160 on the bed 130 may be changed by simply moving the charging device 160. For example, the charging device 160 may be or may be integrated within a thin mat (e.g., a rubber mat) that can be easily moved and placed under a lift device. In yet other embodiments, the delivery vehicle 100 can include multiple charging devices 160 that can be either integrated into or coupled with the bed 130 of the delivery vehicle 100 or moveable on the bed 130.

In other embodiments, the charging device 160 may include a thermal element 163 that, like the thermal element 153 of the electrical power source 150, is configured to generate heating or cooling energy for the purpose of heating or cooling a rechargeable battery of a lift device (or other object) positioned above the charging device 160. For example, the charging device 160 may convert the current received from the electrical power source 150 into heating energy rather than using that current to generate an electromagnetic field via the induction coil 170. The heating or cooling energy generated by current flowing through the charging device 160 may be used to alter the temperature of a rechargeable battery of a lift device positioned above the charging device 160 in order to affect the state of charge, battery capacity, charge or discharge rate, or other parameter that may be affected by a temperature of the battery, according to an exemplary embodiment.

Figure 2:
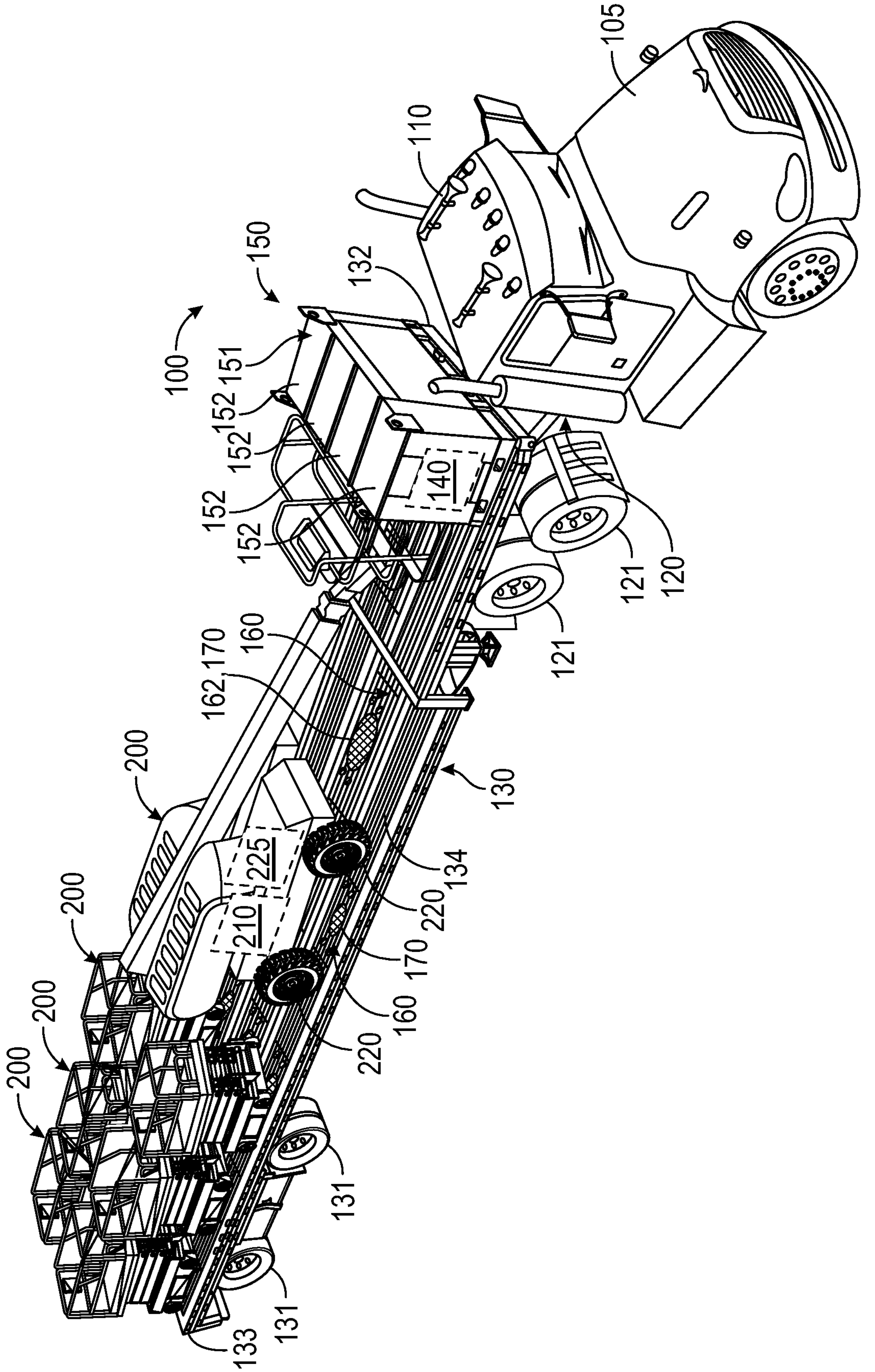
FIG. 2 is a perspective view of the delivery vehicle of FIG. 1 including a plurality of lift devices, according to one embodiment.

Referring now to FIG. 2, a delivery vehicle 100 is shown with a plurality of lift devices 200 resting on the bed 130 of the delivery vehicle 100. The lift device 200 can include a chassis, to support a cab or a rotatable structure, such as a turntable. The chassis can also support a boom assembly, arm assembly, or some other lift assembly configured to lift an operator or materials to some elevated located. For example, the turntable can be rotatable relative to the chassis of the lift device 200. In one embodiment, the turntable can include a counterweight positioned at a rear of the turntable. In other embodiments, the counterweight can be otherwise positioned and/or at least a portion of the weight thereof is otherwise distributed throughout the lift device 200.

The chassis of the lift device 200 can be supported by a plurality of tractive elements, shown as tractive elements 220. The tractive elements 220 can include wheels, a track, or some other tractive element. The lift device 200 may include a plurality of drive actuators that can be positioned to facilitate the independent and selective driving one of the tractive elements 220 to move the lift device 200. In some embodiments, the lift device 200 may only include drive actuators positioned to drive the front tractive elements 220. In another embodiment, the lift device 200 may include drive actuators positioned to drive the front tractive elements 220 and the rear tractive elements 220. In yet other embodiments, the lift device 200 may include drive actuators positioned to drive the rear tractive elements 220. Furthermore, in some embodiments, the lift device 200 may include a plurality of brakes (e.g., one for each tractive element 220, etc.) positioned to independently and selectively restrict rotation of each of the tractive elements 220.

Each of the tractive elements 220 may be powered or unpowered. In some embodiments, the lift device 200 includes a powertrain system including a primary driver 225, such as an electric motor. The primary driver 225 may receive energy from a battery or some other energy storage device, such as a rechargeable battery 210. For example, the primary driver 225 can include an electric motor that receives electrical energy from one or more rechargeable batteries 210. In some embodiments, one or more pumps (e.g., a charge pump, an implement pump, and a drive pump) receive energy from the primary driver 225 (e.g., motive energy provided by the rechargeable battery 210) and provide pressurized hydraulic fluid to power the tractive elements 220 and the other hydraulic components of the lift device 200. In some embodiments, the aforementioned charge pump, implement pump, and drive pump provide pressurized hydraulic fluid to drivers or actuators (e.g., hydraulic motors), that are each coupled to one or more of the tractive elements 220 (e.g., in a hydrostatic transmission arrangement). The drive motors each provide mechanical energy to one or more of the tractive elements 220 to propel the lift device 200. In other embodiments, one drive motor drives all of the tractive elements 220. In other embodiments, the primary driver 225 provides motive energy to the tractive elements 220 through another type of transmission.

As noted above with reference to FIG. 1, the delivery vehicle, 100 may be used to transport lift devices 200 from a rental depot to a job site, from one job site to another job site, from a job site to a rental depot, or otherwise. In various embodiments, at least one function of the lift devices 200 may be powered by a rechargeable battery of the lift device 200, as is discussed in detail with reference to FIG. 4. It may be desirable for a rechargeable battery (e.g., the rechargeable battery 210) of the lift device 200 to have a sufficient state of charge (e.g., be charged to a sufficient degree) as the lift device 200 is delivered to a destination. For example, if the lift device 200 is being delivered to a job site where it will be used to lift operators, payloads, etc., the lift device 200 may desirably have a nearly 100% state of charge so that the lift device 200 may immediately be used at a job site for a long period of time before recharging is required, thereby bolstering machine and job site productivity.

Accordingly, there are circumstances in which it may be beneficial to charge the lift devices 200 with the lift devices 200 positioned atop the bed 130 of the delivery vehicle 100 and while the delivery vehicle is en route to a destination (e.g., a job site). For example, the lift devices 200 may be charged while the delivery vehicle 100 is transporting the lift devices 200 to a job site, rental depot, etc. As described above with reference to FIG. 1, the delivery vehicle 100 includes an electrical power source 150 that is electrically coupled to one or more charging devices 160 that include an induction coil 170. The induction coil 170 is configured to create an electromagnetic field above the upper surface 161 of the charging device 160 when electrical current is received from the electrical power source 150. In various embodiments, the electrical power source 150 and operation of the charging devices 160 and induction coil 170 may be controlled or monitored by the charging control system 140 of the delivery vehicle 100.

In order to charge the lift devices 200 during transport of the lift devices 200 to a job site, rental depot, etc., the lift devices 200 may be parked on the bed 130 of the delivery vehicle 100 in a position corresponding to one of the one or more charging devices 160, according to a exemplary embodiment. The charging devices 160 may have a fixed location (e.g., the charging devices 160 may not be moveable with respect to the bed 130, but instead may be rigidly fastened or fixed to the bed 130). In such embodiments, the lift devices 200 must be parked in a specific position on the bed 130 so that a battery or antenna of the lift device 200 is positioned over the induction coil 170 of the charging device 160, as is discussed in detail below. Similarly, in embodiments where one or more of the charging devices 160 are moveable, a charging device 160 may be placed underneath a parked lift device 200, regardless of a location of the lift device 200 on the bed 130.

Figure 3:
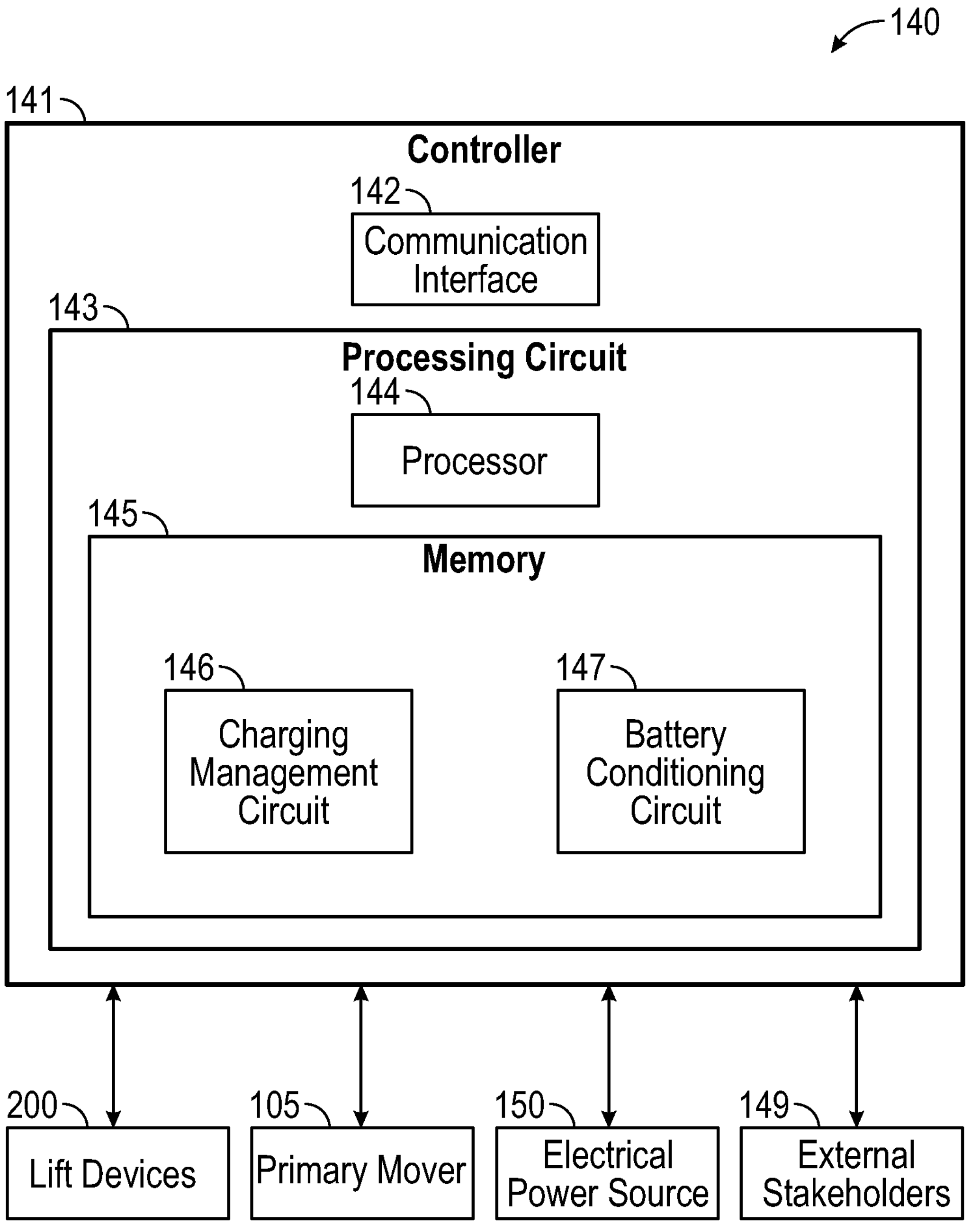
FIG. 3 is a schematic of a control system of the delivery vehicle of FIG. 1, according to one embodiment.

Referring now to FIG. 3, the charging control system 140 is shown, according to an exemplary embodiment. The charging control system 140 can be associated with (e.g., coupled with, integrated with, or otherwise associated with) the delivery vehicle 100, the lift device 200, or some other entity, such as a remote computing system associated with a dispatcher or other entity. The charging control system 140 may include a controller 141 and may be communicably coupled to the one or more lift devices 200. For example, the controller 141 can be communicably coupled with a lift device 200 while the lift device 200 is positioned on the bed 130 of the delivery vehicle 100 or while the lift device 200 is positioned off of the bed 130 of the delivery vehicle 100 (e.g., at a job site). The controller 141 can be communicably coupled with the primary mover 105 of the delivery vehicle 100, the electrical power source 150, and various external stakeholders 149 (e.g., the rental depot dispatcher, a jobsite foreman, a weather service, etc.). The controller 141 may include a communication interface 142 and a processing circuit 143. The processing circuit 143 may include a processor 144 and a memory 145. The memory 145 can include a charging management circuit 146, a battery conditioning circuit 147, or some other circuit. In other embodiments the charging management circuit 146 and the battery conditioning circuit 147 may comprise application-specific circuitry that is not stored in the memory 145. In yet another embodiment, the charging management circuit 146 and the battery conditioning circuit 147 may comprise computer-executable code that is stored in one or more memory devices located remotely from the charging control system 140 and/or delivery vehicle 100. According to an exemplary embodiment, the controller 141 of the charging control system 140 is configured to control and monitor the charging and conditioning of batteries associated with the electrical power source 150 (e.g., the battery assembly 151) and a lift device 200 parked on the bed 130 of the delivery vehicle 100, among other functions.

As indicated above, the controller 141 can include a network interface circuit, shown as communication interface 142. The communication interface 142 can be configured to enable the controller 141 to exchange information over a network, according to an exemplary embodiment. The communication interface 142 can include program logic that facilitates connection of the controller 141 to the network (e.g., a cellular network, a satellite network, Wi-Fi, Bluetooth, radio, etc.). The communication interface 142 can support communications between the controller 141 and other systems, such as a control system of the delivery vehicle 100 that controls the operation of the primary mover 105, a remote monitoring computing system that monitors a fleet of rented lift devices 200, etc. For example, the communication interface 142 can include a cellular modem, a Bluetooth transceiver, a radio-frequency identification (RFID) transceiver, and a near-field communication (NFC) transmitter. In some embodiments, the communication interface 142 includes the hardware and machine-readable media sufficient to support communication over multiple channels of data communication.

The communication interface 142 may also facilitate the transmission of data and commands between the controller 141 and various other systems or devices (e.g., lift devices 200, the primary mover 105, the electrical power source 150, external stakeholders 149, or some other device or system). In such embodiments, the communication interface 142 may communicate with other systems, such as the primary mover 105 and electrical power source 150 via an internal communications network, such as a controller area network (CAN bus) or another vehicle electronic communications protocol. In other embodiments, the communication interface 142 may communicate with other devices or systems, such as lift devices 200 or external stakeholders 149, via a wireless communication protocol (e.g., Bluetooth, Wi-Fi, cellular network, radio communication, etc.). Put another way, each of the lift devices 200, primary mover 105, electrical power source 150, and external stakeholders 149 may be communicably coupled to the controller 141 via the communication interface 142 using some communication protocol as is well understood in the art.

The controller 141 can include at least one processing circuit 143. The processing circuit 143 can include a processor 144 or a memory 145. For example, the processing circuit 143 can include the processor 144 coupled with the memory 145. The processor 144 can be a general purpose or specific purpose processor, an application specific integrated circuit (ASIC), one or more field programmable gate arrays (FPGAs), a group of processing components, or other suitable processing components. The processor 144 can be configured to execute computer code or instructions stored in the memory 145 or received from other computer readable media (e.g., CDROM, network storage, a remote server, or some other location).

The memory 145 can include one or more devices (e.g., memory units, memory devices, storage devices, etc.) for storing data and/or computer code for completing and/or facilitating the various processes described in the present disclosure. The memory 145 can include random access memory (RAM), read-only memory (ROM), hard drive storage, temporary storage, non-volatile memory, flash memory, optical memory, or any other suitable memory for storing software objects and/or computer instructions. The memory 145 may include database components, object code components, script components, or any other type of information structure for supporting the various activities and information structures described in the present disclosure. The memory 145 may be communicably connected to the processor 144 via processing circuit 143 and may include computer code for executing (e.g., by the processor 144) one or more of the processes described herein, according to an exemplary embodiment.

The charging management circuit 146 can be configured to monitor batteries and control the charging/discharging of said batteries, particularly in the context of wirelessly charging lift devices 200 being transported on the bed 130 of the delivery vehicle 100. For example, the charging management circuit 146 can be configured to monitor a state of charge of the rechargeable battery 210 of the lift device 200, a state of charge of the battery assembly 151 of the electrical power source 150, a thermal property (e.g., temperature) of the rechargeable battery 210 of the lift device 200, a thermal property (e.g., temperature) of the battery assembly 151 of the electrical power source 150, or a state of charge or thermal property of some other battery associated with the delivery vehicle 100 that may be used to charge the battery assembly 151 or the lift devices 200. The charging management circuit 146 can determine an optimal time to begin or end a charging cycle associate with the rechargeable batteries of the lift devices 200 or the battery assembly 151 in order to ensure an appropriate state of charge is attained before a certain event (e.g., delivery of the lift device to a job site, etc.). For example, the charging management circuit 146 can receive location data (e.g., global positioning data) related to the delivery vehicle 100 and a job site, calculate an estimated travel time to the job site based on the received location data of the delivery vehicle 100, and initiate a charging operation of the rechargeable battery 210 of the lift device 200 such that the rechargeable battery 210 reaches a substantially (e.g., +95%) charged state as the delivery vehicle 100 reaches the job site. In other embodiments, the charging management circuit 146 may determine an appropriate rate at which to charge the rechargeable battery 210 of the lift device 200 so that an optimal state of charge will be attained at a particular time or as the delivery vehicle 100 reaches a particular location (e.g., a job site).

The charging management circuit 146 can determine that the battery assembly 151 of the electrical power source 150 requires a charge from an external source (e.g., utility source, generator, primary mover 105 of the delivery vehicle 100, etc.). For example, the charging management circuit 146 can determine that a state of charge of the battery assembly 151 is beneath a certain threshold state of charge. Based on the determination that the state of charge of the battery assembly 151 is beneath a threshold state of charge, the charging management circuit 146 can pause (e.g., stop) or throttle (e.g., reduce a rate of) a charging operation, prompt an operator of the delivery vehicle 100 to charge the battery assembly 151, alert a remote dispatcher that the battery assembly 151 is in need of charge, for example. The charging management circuit 146 can receive data from one or more external sources, such as a location services provider (e.g., GPS location tracking service), a weather data service, a traffic information service, or some other provider. For example, the charging management circuit 146 can receive weather data from a weather service provider, where the weather data can indicate an expected temperature change over a period of time (e.g., throughout the day, overnight, or during some other period of time). The charging management circuit 146 can perform a charging operation of the rechargeable battery 210 based on the received weather data. For example, the charging management circuit 146 can initiate, stop, or adjust the rate of a charging operation based on the projected temperature change of an environment over a period of time so as to optimize the charging operation to conserve energy of the battery assembly 151.

The charging management circuit 146 may be configured to command and control various components of the delivery vehicle 100, namely the electrical power source 150 to facilitate charging operations. For example, upon determining a state of charge of the rechargeable battery 210 of the lift device 200 and the battery assembly 151 and an optimal time and rate to charge the rechargeable battery 210 of the lift device 200, the charging management circuit 146 may command the electrical power source 150 to send electrical current to the charging device 160 (and induction coil 170). Likewise, the charging management circuit 146 may command the electrical power source 150 to stop charging the rechargeable battery 210 of the lift device 200 based on a determination that the battery assembly 151 has achieved a predetermined state of charge or upon a determination that the state of charge of the battery assembly 151 is too low to continue charging operations.

Furthermore, in embodiments where there are multiple lift devices 200 being transported on the bed 130 of the delivery vehicle 100 (and thus multiple rechargeable batteries that may require charging), the charging management circuit 146 may be configured to assess the state of charge for each rechargeable battery 210 and, based on state of charge of the battery assembly, the approximate to the delivery destination (e.g., job site), a minimum state of charge required upon delivery, or various other factors, which order to charge each of the multiple lift devices 200. More specifically, the charging management circuit 146 may control the operation of each of the one or more charging devices 160 individually so that one lift device 200 can charged while others are not being charged. In so doing, the charging management circuit 146 can charge the multiple lift devices 200 in a particular sequence, which may be desirable in order to ensure that each of the lift devices 200 achieves an optimal state of charge simultaneously even though each of the rechargeable batteries of the multiple lift devices 200 may begin with a different state of charge, for example.

Although the charging operations discussed above primarily reference wireless charging operations, it should be understood that the electrical power source 150 may be configured to provide a wired charge to the rechargeable battery 210 of the lift device 200. For example, the electrical power source 150 may include a plurality of electrical cords that extend from the electrical power source 150 to each lift device 200 on the bed 130 to establish a wired connection with the rechargeable batteries of each lift device 200. In such embodiments, the charging management circuit 146 may selectively cause current to flow through various electrical cables to charge the lift devices 200, for example. Moreover, certain embodiments may include both wireless charging devices 160 and electrical cables so that charging operations may be both wireless or wired, according to an exemplary embodiment.

The battery conditioning circuit 147 may be configured to ensure that the various batteries (e.g., battery assembly 151 and rechargeable battery 210 of the lift device 200) are conditioned and prepared for use and/or charging/discharging operations. In general, the battery conditioning circuit 147 may be configured ensure that an appropriate state of charge of the various batteries is maintained over a period of time. For example, the battery conditioning circuit 147 can alter a temperature or some other thermal property of the rechargeable battery 210 or the battery assembly 151 to maintain a sufficient state of charge (e.g., +95% charged) after a charging operation is completed. Various conditions can affect the state of charge of batteries, such as ambient temperature, time under charge while the state of charge is high, etc. Accordingly, the battery conditioning circuit 147 may be configured to manage the temperature of various batteries in order to ensure charging operations are efficient and effective. Likewise, the battery conditioning circuit 147 may be configured to cause one or more of the batteries to drain partially or entirely so that the battery can be fully recharged in order to bolster the health of the batteries. In various embodiments, the battery conditioning circuit 147 is configured to ensure that the rechargeable batteries 210 of the lift devices 200 are warm and conditioned for use at a job site, rental depot, or other location before the lift devices 200 are delivered to a destination.

As noted above, the electrical power source 150 may include a thermal element 153 that is configured to insulate, heat, or cool the battery assembly 151. Moreover, the charging device 160 may also include a thermal element 163, namely a heating element or cooling element, that can be configured to generate and direct heating or cooling energy towards the rechargeable battery 210 of a lift device 200, for example. According to an exemplary embodiment, the battery conditioning circuit 147 may determine that, based on an ambient temperature measurement or a temperature of a rechargeable battery 210 of the lift device 200, that a charging rate, state of charge, or battery capacity may be beneficially influenced by heating or cooling energy from the charging device 160. For example, if the rechargeable battery 210 of the lift device 200 is too cold to reach a desirable state of charge (e.g., 100% charged), the battery conditioning circuit 147 may command charging device 160 to use current provided by the electrical power source 150 to generate heating energy that will ultimately be transferred to said rechargeable battery until a desired battery temperature is achieved.

Similarly, the lift device 200 may have one or more thermal elements, namely a heating or cooling element, that is configured to provide heating or cooling energy to the rechargeable battery of the lift device 200. More specifically, the heating or cooling elements may dissipate heat or cooling energy when powered in response to a command provided by the battery conditioning circuit 147. In one embodiment, the battery conditioning circuit 147 may determine an approximate temperature of the rechargeable battery of the lift device 200 based on an ambient temperature, a temperature sensor mounted to the lift device 200 (e.g., a temperature sensor proximate to the rechargeable battery 210), or some other temperature information (e.g., temperature data received from a weather service). Based on the determined temperature of the rechargeable battery 210, the battery conditioning circuit 147 transmit a command to a thermal element of the lift device 200, where the command causes the thermal element to generate heating or cooling energy to alter the temperature of the rechargeable battery 210 as may be necessary to improve battery capacity, improve battery charging/discharging rates, etc.

In various embodiments, the charging management circuit 146, the battery conditioning circuit 147, and any other circuits associated with the controller 141, may communicate information, data, or commands to each other. In other embodiments, the various circuits 146, 147 may perform operations in tandem or sequentially. For example, the charging management circuit 146 may identify a need to charge the rechargeable batteries 210 of one or more lift devices 200 and may complete a charging operation accordingly. Thereafter, the battery conditioning circuit 147 may perform operations to maintain a state of charge, battery temperature, etc. so that when the lift devices 200 are needed, the rechargeable batteries are ready for use. In one example, the controller 141 may charge the rechargeable batteries of some lift devices 200 while conditioning the batteries of other lift devices 200. In another example, the controller 141 may charge and condition the rechargeable batteries 210 of one or more lift devices 200 over a long period of time, such as overnight. In such embodiments, the controller 141 may direct current to the charging devices 160 using an external power source (e.g., a utility source, wall outlet, etc.) rather than using the electrical power source 150 of the delivery vehicle 100. Relatedly, the controller 141 may charge and condition the battery assembly 151 of the electrical power source 150, particularly in situations where the delivery vehicle 100 and the lift devices 200 will remain in adverse conditions (e.g., hot temperatures, cold temperatures, etc.) for an extended period of time (e.g., while the delivery vehicle 100 is parked at a rental depot overnight and before morning deliveries to a job site).

Figure 4:
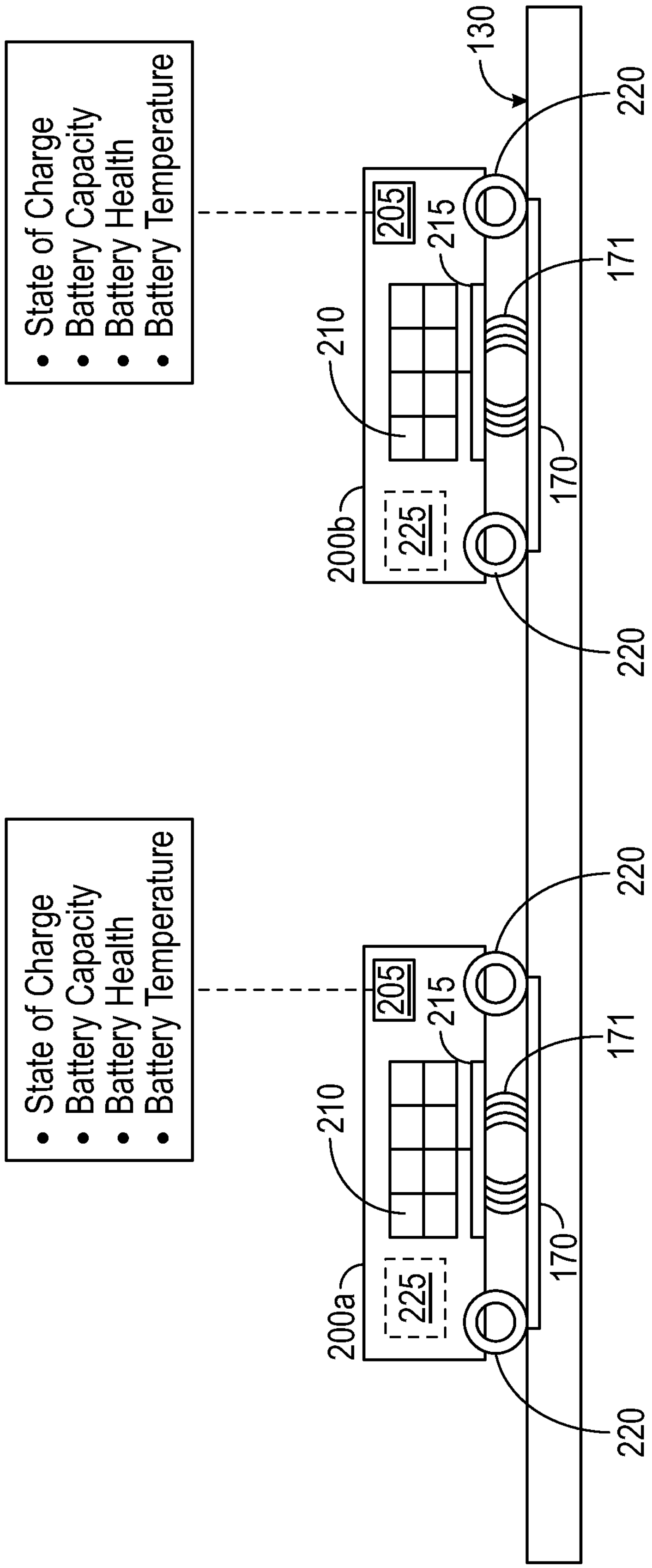
FIG. 4 side view of two lift devices on a bed of the delivery vehicle of FIG. 1, according on one embodiment.

Referring now to FIG. 4, two lift devices 200, namely lift device 200(*a*) and lift device 200(*b*), are shown on the bed 130 of the delivery vehicle shown in FIGS. 1 and 2, according to an exemplary embodiment. As noted above, the lift devices 200(*a*) and 200(*b*) can each be a variety of different lift devices, including an AWP, an MEWP, a scissor lift, telehandler, electric scissor lift, forklift, or other suitable lift devices that include one or more battery-operated or electrical components associated with a rechargeable battery. In various embodiments, the delivery vehicle 100 may use one or more actuators to tilt the lower the second end 133 of the bed 130 (e.g., raise the first end 132) in order to receive the lift devices 200(*a*) and 200(*b*). For example, the second end 133 of the bed 130 may be lowered until it is low enough for a lift device 200 to drive onto the bed 130 and engage the charging device 160 as described above. In other embodiments, a separate ramp is positioned in between a lift device 200 and the bed 130, thereby allowing the lift device 200 to drive onto the bed 130 and engage a charging device 160. In other embodiments still, the lift device 200 may be lifted onto the bed 130 via crane or some other lift.

Each of the lift devices 200(*a*) and 200(*b*) may include one or more rechargeable batteries 210 and an antenna coil 215. The one or more rechargeable batteries 210 may be electrically coupled to the antenna coil 215 and configured to receive current from and send current to the antenna coil 215. Similarly, the antenna coil 215 may be configured to receive current from an induction coil 170 of the bed 130. As indicated above, the charging devices 160 of the delivery vehicle 100 may include an induction coil 170 that is configured to generate an electromagnetic field, such as electromagnetic field 171, when powered by an electrical energy source (e.g., the electrical power source 150). To receive electrical energy from the induction coil 170, the antenna coil 215 of the lift device 200 may be positioned directly or partially above the induction coil 170, as is shown in FIG. 4. When the induction coil 170 of the charging device 160 is energized, the electromagnetic field 171 may be generated and may be received by the antenna coil 215 of a lift device 200.

The antenna coil 215, like the induction coil 170 described above, is formed of copper wire that includes a series of turns. When the antenna coil 215 is positioned within the electromagnetic field 171 that is generated by the induction coil 170, a current in generated within the antenna coil 215 that can then be provided to the one or more rechargeable batteries 210. This current is used to charge the one or more rechargeable batteries 210, according to an exemplary embodiment. In various embodiments, the antenna coil 215 is positioned at or near a base of a chassis of a lift device 200, as is shown in FIG. 4 so as to increase an intensity of the electromagnetic field 171 exposed to the antenna coil 215 and thereby increase the current flowing to the rechargeable batteries 210.

In some embodiments, the lift devices 200(*a*), 200(*b*) may be charged while the antenna coil 215 is positioned directly or approximately directly above the induction coil 170 of a charging device 160. Although shown centered on the lift devices 200(*a*) and 200(*b*) above the induction coil 170, the antenna coil 215 of the lift device 200 may also be positioned to a side (e.g., front, rear, right, left) of the lift device 200. For example, in some embodiments, the antenna coil 215 is offset to one of the corners of the chassis. In other embodiments, the antenna coil 215 is not located on the chassis of the lift device 200, but is rather located on an implement of the lift device 200, such as a telescoping boom arm, fork assembly, bucket arm, etc. In these various embodiments, the antenna coil 215 of the lift device 200 may be positioned directly or approximately directly above the induction coil 170. In some embodiments, the lift device 200 includes an indicator (e.g., a light) on the chassis, such as within a cab of the lift device 200, that illuminates when the antenna coil 215 is positioned within a charging area of the charging device 160 and the rechargeable battery 210 is receiving power (e.g., the rechargeable battery 210 is charging). The lift device 200 may determine when the antenna coil 215 is positioned above the induction coil 170 using optical sensors positioned on the lift device 200, the delivery vehicle 100, or otherwise. In some embodiments, the indicator may also provide a visual indication of a charging state of the rechargeable batteries 210. For example, the indicator may provide an indication that charging is schedule, that charging is occurring, that charging is completed, that battery conditioning is occurring, or otherwise.

Although the wireless charging operations described herein reference an induction coil 170, various other types of wireless charging mechanisms can be used. For example, magnetic resonance charging, electric field coupling, or radio receptioning can be used in lieu of electromagnetic induction. While operationally different, the structure for each different type of wireless charging mechanism described above can be considered to be encompassed within the term "induction coil."

As shown in FIG. 4, the lift devices 200(*a*) and 200(*b*) may each have a controller 205. The controller may include a communication interface, a processing circuit having a processor, and a memory storing instructions thereon that, when executed by the processor cause the processor to perform various operations. The controller 205 and its various related components may have an architecture and structure similar to the controller 141 described above with reference to FIG. 3. Accordingly, in at least some embodiments, the controller 205 may be configured for wireless communication with other devices, such as other lift devices 200, the delivery vehicle 100, a rental dispatch center, etc.

According to an exemplary embodiment, the lift devices 200(*a*) and 200(*b*) may be communicably coupled to the control system 140 of the delivery vehicle 100. More specifically, the lift devices 200(*a*) and 200(*b*) may transmit data, information, and commands to the controller 141 and receive data, information, and commands from the controller 141 in connection with charging operations as herein described. For example, as depicted in FIG. 4, each of the lift devices 200(*a*) and 200(*b*) may communicate information related to a current state of the lift device 200(*a*), 200(*b*) and the rechargeable battery 210 coupled thereto. According to an exemplary embodiment, the controller 141 may receive information from each lift device 200(*a*), 200(*b*) related to a current state of charge of the rechargeable batteries 210, a current capacity of the rechargeable batteries 210, the health of the rechargeable batteries 210, a temperature of the rechargeable batteries 210, etc. In other embodiments, the controller 205 of the lift devices 200(*a*) and 200(*b*) may transmit to the controller 141 information regarding an operation or task that the lift device 200(*a*) or 200(*b*) will be used to perform in connection with a job site (e.g., delivery to a job site at 9:00 am for eight hours of service handling bulk wood materials, etc.).

As described above, the controller 141 may be configured to schedule or coordinate various charging operations based on information regarding a lift device 200 (e.g., a state of charge, a desired state of charge, etc.). Similarly, the controller 141 may be configured to schedule or coordinate charging operations associated with a plurality of lift devices 200 that may be transported on the bed 130 of the delivery vehicle 100 at the same time, such as the lift device 200(*a*) and the lift device 200(*b*) shown in FIG. 4. Accordingly, the controller 141 may collect information, data, or commands from each of the lift devices 200(*a*) and 200(*b*) in order to coordinate charging and conditioning operations of both lift devices 200(*a*) and 200(*b*) as discussed above with reference to the charging management circuit 146 and battery conditioning circuit 147 of FIG. 3. Using this information, the controller 141 may determine that the lift device 200(*a*) has a lesser state of charge than the lift device 200(*b*), and may begin charging the lift device 200(*a*) before charging the lift device 200(*b*). Likewise, the controller 141 may determine that the battery temperature of the lift device 200(*b*) is undesirably low, while the battery temperature of the lift device 200(*a*) is satisfactory. On this basis, the controller 141 perform battery conditioning operations on the rechargeable battery 210 of lift device 200(*b*) while beginning charging operations on the rechargeable battery 210 of lift device 200(*a*). In yet another embodiment, the controller 141 may determine that the battery assembly 151 only has as state of charge that is sufficient to partially charge the rechargeable batteries 210 of both lift devices 200(*a*) and 200(*b*), and may adjust a charging schedule accordingly.

Figure 5:
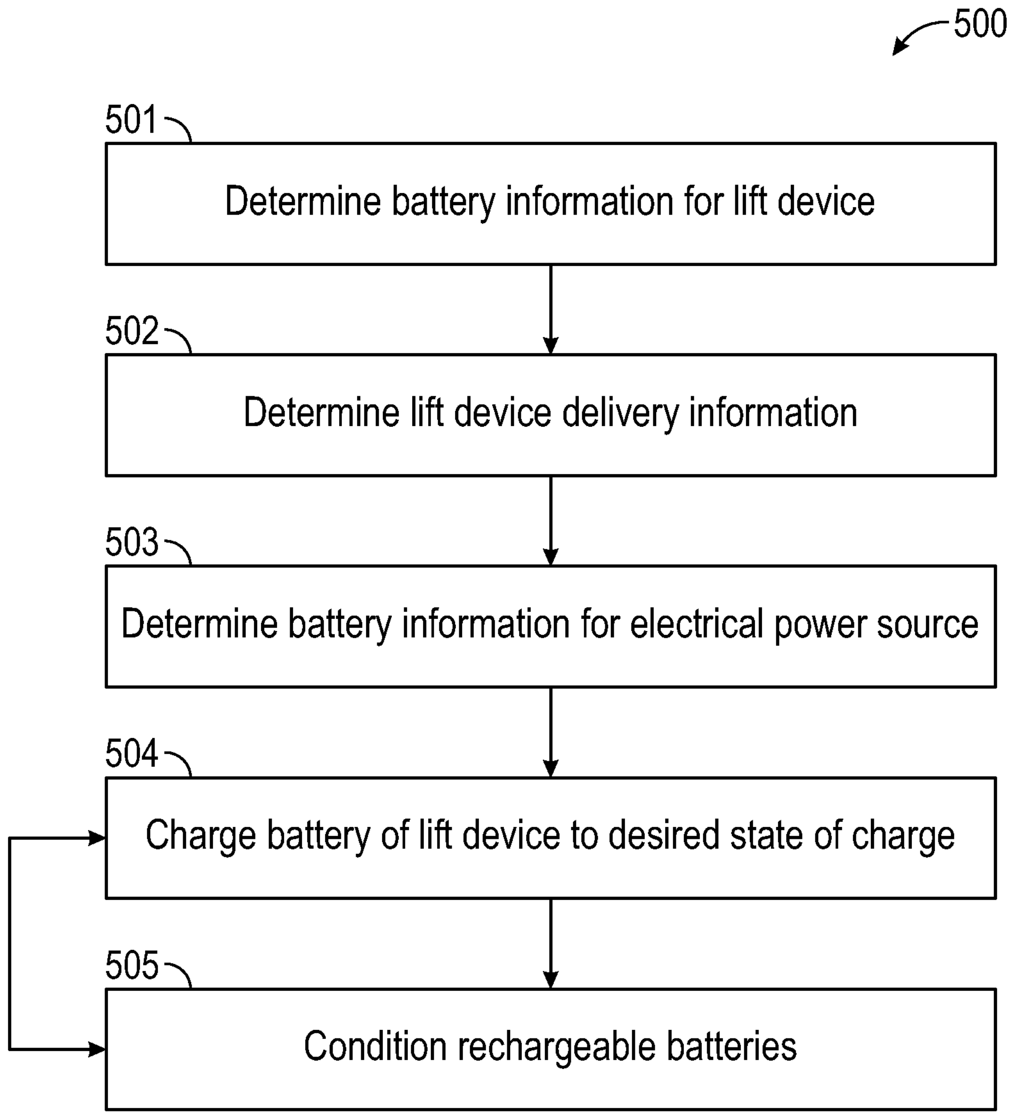
FIG. 5 is a flow chart of a method of charging a lift vehicle, according to one embodiment.

Referring now to FIG. 5, a flow chart of a method 500 for wirelessly charging a lift device is shown. The method 500 may be performed by the controller 141 of the delivery vehicle, as herein described and as shown with reference to FIGS. 1-4. More specifically, the method 500 may be performed by the charging management circuit 146 and the battery conditioning circuit 147 of the controller 141, according to an exemplary embodiment.

At process 501, the controller 141 may determine battery information for a lift device, such as the lift device 200 described above. As shown in FIG. 4 and discussed above, the lift device 200 may include a controller 205 that is configured to transmit information regarding one or more rechargeable batteries 210 of the lift device 200 to the controller 141. Accordingly, the controller 141 may be configured to receive information regarding a current state of the one or more rechargeable batteries 210 of the lift device 200. This information may include, for example, a current state of charge of the rechargeable batteries 210, a current maximum charge capacity of the rechargeable batteries 210, one or more parameters related to the health of the rechargeable batteries 210 (e.g., discharge cycle time, or some other parameter), a temperature of the rechargeable batteries 210, etc. As discussed above, this information may be used by the controller 141 to plan, schedule, or coordinate a charging operation or a battery conditioning operation, according to an exemplary embodiment.

According to one embodiment, the controller 141 may receive the aforementioned battery information via wireless communication from the controller 205. In other embodiments, the controller 205 of the lift device 200 may not be communicably coupled to the controller 141, but may instead by communicably coupled to another entity, such as a rental depot dispatcher computer system of job site management computer system, where the other entity is communicably coupled to the controller 141. In yet another embodiment, the lift device 200 may not have a controller 205 and the battery information may be provided to the controller 141 via manual means (e.g., manually input into a user interface of the delivery vehicle 100, such as a touch screen mounted within the cab 110 of the delivery vehicle 100 or a mobile application installed on a mobile device of an operator).

In various embodiments, the controller 141 may be configured to receive battery information regarding a plurality of lift devices 200 that may be transported on the bed 130 of the delivery vehicle 100 at any given time. For example, a plurality of lift devices 200 may be transported on the bed 130 of the delivery vehicle 100 simultaneously. In another embodiment, one or more lift devices 200 may be delivered to a destination (e.g., a job site) simultaneously, while at the same destination, another one or more lift devices 200 may be retrieved for transport to a second destination (e.g., a rental depot). As discussed above, the controller 141 may collect data from a plurality of lift devices 200, particularly related to the rechargeable batteries 210 of each lift device 200, so that the controller may plan and coordinate a plurality of battery charging and conditioning operations, according to an exemplary embodiment.

At process 502, the controller may determine delivery information for the lift device 200. In general, the delivery information for the lift device 200 can include information related to an upcoming delivery of the lift device 200 to a job site, rental depot, etc. More specifically, the delivery information may include a date and time of a scheduled delivery, a duration until the lift device 200 will be delivered, an estimated distance between the current location of the delivery vehicle 100 and the destination, a duration of time the lift device 200 is expected to be used at the destination, the nature of operations the lift device 200 is expected to perform at the destination, an estimated idle time at the destination before operations of the lift device 200 begin, etc. In other words, the controller 141 may be configured to collect information regarding when and how the lift device 200 will be delivered and used.

According to an exemplary embodiment, the controller 141 may receive this information from one or more of the lift device 200 (e.g., from the controller 205), from a rental depot dispatcher that manages the schedule for the lift device 200, a foreman or manager at a job site, etc. In various embodiments, and as shown in FIG. 3, the controller 141 may be communicably coupled to one or more lift devices 200 and external sources (e.g., rental depot dispatcher computer system, etc.) and may thus receive lift device delivery information via wireless communication. In another embodiment, the controller 141 may receive delivery information from another source, manually, or otherwise, as noted above. Furthermore, the controller 141 may receive delivery information for the one or more lift devices 200, as also noted above.

At process 503, the controller 141 may determine battery information a battery assembly 151 of the electrical power source 150, according to an exemplary embodiment. For example, the controller 141 may determine a state of charge, a maximum capacity, an indication of battery health, and a battery temperature for the battery assembly 151 of the electrical power source 150. In some embodiments, the controller 141 may determine battery information for each modular battery unit 152.

At process 504, the controller 141 may charge the rechargeable battery 210 of a lift device 200. More specifically, the controller 141 may implement a charging operation based on the information received and determined at processes 501-503. The charging operation may be determined by the charging management circuit 146 discussed above. In one embodiment, the charging management circuit 146 of the controller 141 may determine, based on the battery information of the one or more rechargeable batteries 210 of the lift device determined at process 501, the delivery information for the lift device 200 received at process 502, and the battery information of the electrical power source 150 received at process 503, an optimal charging plan or schedule by which to charge the lift device 200. For example, the controller 141, by the charging management circuit 146, may determine that the charging operation should begin at a predetermined time so that the rechargeable battery 210 is at full charge when the lift device 200 is delivered to a job site. In another example, the controller 141 may determine an order in which multiple lift devices 200 should be charged so that each of a plurality of lift devices 200 is at a desired state of charge at a specific time. In yet another example, the controller 141 may determine that the one or more rechargeable batteries 210 of a lift device 200 should be charged to less than full capacity so that the battery assembly 151 of the electrical power source 150 has sufficient charge to charge another lift device 200 that will be retrieved at a later time.

As is discussed above in detail, the charging management circuit 146 can be configured to determine when, for what duration, and in what order to charge a lift device 200 of a plurality of lift devices 200. As will be appreciated, the information retrieved at processes 501-503 may vary from situation to situation, and thus the determinations made by the charging management circuit 146 as to how and when to initiate a charging operation may be numerous. According to an exemplary embodiment, the charging management circuit 146 may make determinations according to predefined settings or preferences as specified by a rental depot manager, the delivery vehicle 100 driver, or other individual. In another embodiment, the charging management circuit 146 may learn, over time, various ways to optimize a charging operation by monitoring changes to the battery information during and after completed charging operations, for example.

At process 505, the controller 141 may condition the one or more rechargeable batteries 210 of a lift device 200. As discussed above in detail with reference to FIG. 3, the controller may include a battery conditioning circuit 147 that is configured to control and manage operations related to battery conditioning. More specifically, the battery conditioning circuit 147 may be configured to maintain a charge of a battery (e.g., the rechargeable batteries 210 of a lift device or the battery assembly 151 of the delivery vehicle 100) and operate thermal elements (e.g., thermal elements 153, 163) to moderate a temperature of the battery assembly 151, the rechargeable battery 210, or some other battery, for example. To accurately and effectively perform such operations, the battery conditioning circuit 147 may be configured to use the information received at processes 501-503.

In one embodiment, the controller 141 may, via the battery conditioning circuit 147, determine that the one or more rechargeable batteries 210 of a lift device 200 should be warmed to a predetermined temperature prior to a scheduled delivery. In another embodiment, the controller 141 may determine that the rechargeable batteries 210 of a lift device are too warm to operate properly. Accordingly, the controller 141 may cause thermal elements 163 to provide cooling energy to the rechargeable batteries 210 of the lift device. In yet another embodiment, the controller 141 may determine that the battery assembly 151 has a diminished capacity because of adverse ambient temperatures. In such embodiments, the controller 141 may cause the thermal element 153 to operate for the purpose of regulating the temperature of the battery assembly 151. In still another embodiment, the controller 141 may determine that the health of a rechargeable battery 210 may be bolstered by fully discharging the rechargeable battery 210. Accordingly, the controller 141 may prompt a lift device 200 to discharge the rechargeable battery 210.

In some embodiments, the controller 141 may perform the battery conditioning operation of process 505 before performing the charging operation of processes 504. Put another way, process 504 and 505 may be performed in any particular order. Moreover, each of processes 504 and 505 may be performed multiple times during method 500. For example, in one embodiment, the controller 141 may determine that before a charging operation can be performed, a battery conditioning operation should be performed so that the rechargeable batteries 210 of the lift device 200 are prepared to receive a charge. More specifically, the controller 141 may determine that a temperature of the rechargeable batteries 210 is too low to charge at a rate required to achieve a desired state of charge. Accordingly, the battery conditioning circuit 147 may cause the thermal element 163 of the charging device 160 to generate heating energy sufficient to raise the temperature of the rechargeable batteries 210, for example. Thereafter, the process 504 may occur to charge the rechargeable battery 210 to a desired state of charge. After that, the process 505 may occur once more to maintain a desired battery temperature in order to preserve a desired state of charge and discharge rate.

Using the above-described delivery vehicle 100, control system 140, electrical power source 150, and associated systems and methods, one or more electrified lift devices 200 may be charged during transport of said lift devices 200. The delivery vehicle 100 can create a faster and more efficient way to charge one or more lift devices 200 during a time when the lift devices 200 are otherwise inoperable. By utilizing machine downtime to recharge and condition lift device batteries, the systems and methods described herein bolster efficiency and machine productivity while extending the life of rechargeable batteries.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the system (e.g., coordinated lighting system, meshed beacon or road-flare system, virtual boundary system, etc.) as shown in the various exemplary embodiments is illustrative only. Additionally, any element disclosed in one embodiment may be incorporated or utilized with any other embodiment disclosed herein.

What is claimed is:

1. A delivery vehicle, comprising:

a plurality of tractive elements;

a bed;

an electrical power source comprising a battery assembly;

one or more wireless charging devices electrically coupled with the electrical power source and configured to wirelessly provide power to one or more rechargeable batteries of one or more lift devices positioned on the bed via an inductive coil; and a controller communicably coupled with the electrical power source and configured to:

determine battery information regarding a state of charge of the battery assembly and a state of charge of the one or more rechargeable batteries of the one or more lift devices;

receive location data related to a job site;

based on the determined battery information and the location data, determine at least one of a charge rate or a charge start time regarding a charging operation for the one or more rechargeable batteries of the one or more lift devices, wherein the at least one of the charge rate or the charge start time are determined such that charging operation achieves a desired state of charge for the one or more rechargeable batteries by a delivery time when the one or more lift devices arrive at the job site; and begin, based on the at least one of the charge rate or the charge start time, charging the one or more rechargeable batteries of the one or more lift devices via the inductive coil of the one or more wireless charging devices.

2. The delivery vehicle of claim 1, wherein charging the one or more rechargeable batteries comprises charging the one or more rechargeable batteries of the one or more lift devices while the delivery vehicle is in transit to the job site.

3. The delivery vehicle of claim 1, wherein the determined battery information includes a first state of charge of a first rechargeable battery of a first lift device and a second state of charge of a second rechargeable battery of a second lift device.

4. The delivery vehicle of claim 3, wherein charging the one or more rechargeable batteries comprises initiating a first charging operation to charge the first rechargeable battery at a first time and initiating a second charging operation to charge the second rechargeable battery at a later time.

5. The delivery vehicle of claim 4, wherein the first charging operation and the second charging operation occur at least partially simultaneously.

6. The delivery vehicle of claim 1, wherein the controller is further configured to:
- receive data regarding a thermal parameter of the battery assembly; and
- modify, based on the received data, a rate of the charging the charge rate.

7. The delivery vehicle of claim 6, wherein the electrical power source further comprises a thermal element configured to provide thermal energy to the battery assembly, the controller is further configured to:
- cause, based on the received data, the thermal element to provide thermal energy to the battery assembly to maintain the state of charge of the battery assembly.

8. The delivery vehicle of claim 1, wherein the one or more rechargeable batteries of the one or more lift devices comprises a thermal element configured to provide thermal energy to the one or more rechargeable batteries, the controller is further configured to:
- receive second data regarding a thermal parameter of the one or more rechargeable batteries; and
- cause, based on the received second data, the thermal element to provide thermal energy to the one or more rechargeable batteries to maintain the state of charge of the battery assembly.

9. The delivery vehicle of claim 1, wherein the controller is further configured to:
- receive, from a remote dispatcher, delivery information associated with the one or more lift devices, and
- begin charging the one or more rechargeable batteries based on the received delivery information associated with the one or more lift devices.

10. The delivery vehicle of claim 1, wherein the one or more wireless charging devices are integrated in the bed.

11. The delivery vehicle of claim 1, wherein the one or more wireless charging devices are moveable atop the bed.

12. A method of charging an electrified lift device during transportation, the method comprising:
- determining, by a controller of a delivery vehicle, first battery information regarding a state of charge of one or more rechargeable batteries of one or more lift devices positioned on a bed of the delivery vehicle, wherein the delivery vehicle includes a plurality of tractive elements and is configured to transport the one or more lift devices to a destination;
- receiving location data regarding a job site where the one or more lift devices are being delivered;
- based on the determined battery information and the location data, determining a charge rate and a charge start time regarding a charging operation for the one or more rechargeable batteries of the one or more lift devices, wherein the charge rate and the charge start time are determined such that the charging operation achieves a desired state of charge for the one or more rechargeable batteries of the one or more lift devices by a delivery time when the one or more lift devices arrive at the job site;
- receiving data regarding a thermal parameter of one of the one or more rechargeable batteries;
- beginning, based on the charge rate and the charge start time, charging the one or more rechargeable batteries of the one or more lift devices while the delivery vehicle is transporting the one or more lift devices to the destination; and
- modifying, based on the data regarding the thermal parameter, the charge rate from a first rate to a second rate to charge the one or more rechargeable batteries of the one or more lift devices,
- wherein the delivery vehicle further comprises an electrical power source, the electrical power source configured to provide electrical power to charge the one or more rechargeable batteries of the one or more lift devices during the charging operation.

13. The method of claim 12, further comprising:
- determining, by the controller of the delivery vehicle, delivery information for the one or more lift devices,
- wherein charging the one or more rechargeable batteries of the one or more lift devices is further based on the delivery information.

14. The method of claim 12, wherein the electrical power source comprises a plurality of rechargeable batteries.

15. The method of claim 14, wherein the plurality of rechargeable batteries is coupled to the bed of the delivery vehicle.

16. The method of claim 12, wherein the electrical power source is electrically coupled with a wireless charging device having an induction coil, the induction coil configured to generate an electromagnetic field above the wireless charging device when powered by the electrical power source.

17. The method of claim 16, wherein the one or more lift devices further comprises an antenna coil that is communicably coupled to at least one of the one or more rechargeable batteries, wherein recharging the one or more rechargeable batteries occurs wirelessly via the wireless charging device, wherein the antenna coil is energized by the electromagnetic field.

18. A controller for a delivery vehicle, comprising:
- a communication interface; and
- a processing circuit communicably coupled with the communication interface, the processing circuit comprising one or more processors and a memory storing instructions that, when executed by the one or more processors cause the one or more processors to perform operations, comprising:
  - determining battery information regarding a state of charge of a battery assembly of the delivery vehicle and a state of charge of one or more rechargeable batteries of one or more lift devices positioned on a bed of the delivery vehicle;
  - receiving location data regarding a job site where the one or more lift devices are being delivered;
  - based on the determined battery information and the location data, determining a charge rate and a charge start time regarding a charging operation for the one or more rechargeable batteries of the one or more lift devices, wherein the charge rate and the charge start time are determined such that the charging operation achieves a desired state of charge for the one or more rechargeable batteries of the one or more lift devices by a delivery time when the one or more lift devices arrive at the job site;
  - determining data regarding a thermal parameter of the battery assembly;
  - initiating, based on the first battery information, the charge rate, and the charge start time, a charging operation to wirelessly charge the one or more rechargeable batteries of the one or more lift devices via an inductive coil of one or more wireless charging devices; and modifying, based on the data regarding the thermal parameter of the battery assembly, the charge rate from a first rate to a second rate to charge the one or more rechargeable batteries of the one or more lift devices.

19. The controller of claim 18, wherein the operations further comprise:

receiving, from a remote dispatcher via the communication interface, delivery information associated with the one or more lift devices, wherein the charging operation is based on the received delivery information associated with the one or more lift devices.

* * * * *